(12) United States Patent
Aiello

(10) Patent No.: US 10,074,025 B2
(45) Date of Patent: Sep. 11, 2018

(54) DEVICE AND METHOD FOR DECODING GRAPHIC PATTERNS

(71) Applicant: Shenzhen Pu Ying Innovation Technology Corporation Limited, Shenzhen (CN)

(72) Inventor: Sergio Aiello, Ivrea (IT)

(73) Assignee: Shenzhen Pu Ying Innovation Technology Corporation Limited, Shenzhen (CN)

( * ) Notice: Subject to any disclaimer, the term of this patent is extended or adjusted under 35 U.S.C. 154(b) by 0 days.

(21) Appl. No.: 15/101,813

(22) PCT Filed: Dec. 5, 2013

(86) PCT No.: PCT/IB2013/060674
§ 371 (c)(1),
(2) Date: Jun. 3, 2016

(87) PCT Pub. No.: WO2015/082961
PCT Pub. Date: Jun. 11, 2015

(65) Prior Publication Data
US 2016/0307060 A1    Oct. 20, 2016

(51) Int. Cl.
*G06K 9/00* (2006.01)
*G06K 9/18* (2006.01)
*G07D 7/12* (2016.01)
*G07D 7/121* (2016.01)
*G07D 7/20* (2016.01)

(52) U.S. Cl.
CPC ......... *G06K 9/186* (2013.01); *G06K 9/00442* (2013.01); *G07D 7/12* (2013.01); *G07D 7/121* (2013.01); *G07D 7/20* (2013.01)

(58) Field of Classification Search
None
See application file for complete search history.

(56) References Cited

U.S. PATENT DOCUMENTS

| | | | | |
|---|---|---|---|---|
| 5,428,458 | A * | 6/1995 | Aiba | H04N 1/00206 358/405 |
| 7,722,025 | B2 * | 5/2010 | Giacometto | B41J 3/4075 271/2 |
| 2002/0015145 | A1 * | 2/2002 | Numata | G07D 7/121 356/71 |

(Continued)

FOREIGN PATENT DOCUMENTS

GB    2107911 A    5/1983

*Primary Examiner* — Nancy Bitar
(74) *Attorney, Agent, or Firm* — Howson & Howson LLP

(57) ABSTRACT

A device for reading and decoding paper or non-paper documents (12) including micro-perforated or "watermark" patterns and graphic patterns is provided. The device comprises at least one image sensor (11) having a light flashing means (33, 44) arranged to flash first light signals on a first side (12a, 12b) of a document (12), and image sensor reading means (31, 41) arranged to read the first light signals reflected by the graphic patterns (6, 7). The device further comprises at least one array of infrared light emitting means (14, 24) located in front of said image sensor (11) and arranged to flash second light signals on a second side (12b) of the document (12) whereby image sensor reading means (31, 41) are arranged to read the infrared light signals passing through the micro-perforated or "watermark" patterns (5).

9 Claims, 5 Drawing Sheets

(56) References Cited

U.S. PATENT DOCUMENTS

| | | | |
|---|---|---|---|
| 2004/0125358 A1* | 7/2004 | Numata | G07D 7/121 356/71 |
| 2004/0164248 A1* | 8/2004 | Nago | G07D 7/121 250/341.7 |
| 2010/0258629 A1* | 10/2010 | Huang | G06K 9/2018 235/449 |

* cited by examiner

DEVICE AND METHOD FOR DECODING GRAPHIC PATTERNS

TECHNICAL FIELD

The present invention relates, in general, to a device arranged for decoding graphic patterns and to a corresponding method.

In particular, the present invention relates to a device provided for reading and decoding (acquiring) patterns comprised in documents, such as for instance cheques issued by a bank in order to avoid frauds.

BACKGROUND ART

Cheques are known in the art.

As is known, in order to obtain a very high security level upon reading, decoding and certifying cheques 3 (FIG. 1) and to avoid frauds, micro-perforated characters or symbols (patterns) 5 are provided therein in addition to characters or symbols (patterns) graphically 6 or magnetically 7 imprinted on one or both sides of the cheque. The micro-perforated characters, for instance, are made of through micro-holes having a diameter, in general, lower than 0.254 mm, so that a reading resolution arranged to recognize the through micro-holes is required.

As is also known, the micro-perforated characters need to be read, decoded and compared with the imprinted characters so that only at the end of the above process, if the micro-perforated characters correspond to the imprinted characters, the cheque is considered to be valid.

The above process needs to be very reliable and fast. Therefore, a device arranged to implement the above process needs to be very simple and effective.

As known, apparatuses are known for acquiring documents including graphical and/or magnetic imprinted patterns.

For instance from publication WO2006/005560 an apparatus or device is known arranged for reading, decoding and certifying documents comprising graphical and/or magnetic patterns.

Such a device cannot manage micro-perforated patterns and therefore cannot solve the problem of managing graphical and/or magnetic patterns and micro-perforated patterns.

Moreover the above problem requires to be solved in a simple and effective way by, possibly, integrate the solution in a single device.

In general, the Applicant has found that the problem of having a single apparatus or device intended to manage both graphical and/or magnetic patterns and micro-perforated patterns is not satisfied.

DISCLOSURE OF THE INVENTION

The object of the present invention is thus to meet the needs outlined above by providing a device and method that are very simple and effective.

According to the present invention, such an object is achieved by means of a device and method for decoding graphic patterns having the features set forth in the claims that follow.

The following summary of the invention is provided in order to provide a basic understanding of some aspects and features of the invention. This summary is not an extensive overview of the invention, and as such it is not intended to particularly identify key or critical elements of the invention, nor to delineate the scope of the invention. Its sole purpose is to present some concepts of the invention in a simplified form as a prelude to the more detailed description that is presented below.

According to a feature of a preferred embodiment the device comprises at least one image sensor having flashing means arranged to flash light on a first side of a document and at least one array of light emitting means arranged to flash light on a second side of the document whereby reading means provided with the image sensor are arranged to read both graphic patterns by using light reflection and micro-perforated patterns or "watermark" patterns by using light passing through them.

According to a further feature of present invention the device is arranged to use grey scale signals, color scale signals and/or infrared scale signals.

According to another feature of present invention the device comprises a control circuit arranged to manage the reading means to read the graphic patterns and the micro-perforated patterns or "watermark" patterns and obtain bit-maps thereof.

BRIEF DESCRIPTION OF DRAWINGS

These and further features and advantages of the present invention will appear more clearly from the following detailed description of preferred embodiments, provided by way of non-limiting examples with reference to the attached drawings, in which components designated by same or similar reference numerals indicate components having same or similar functionality and construction and wherein.

BEST MODES FOR CARRYING OUT THE INVENTION

Figure 1:
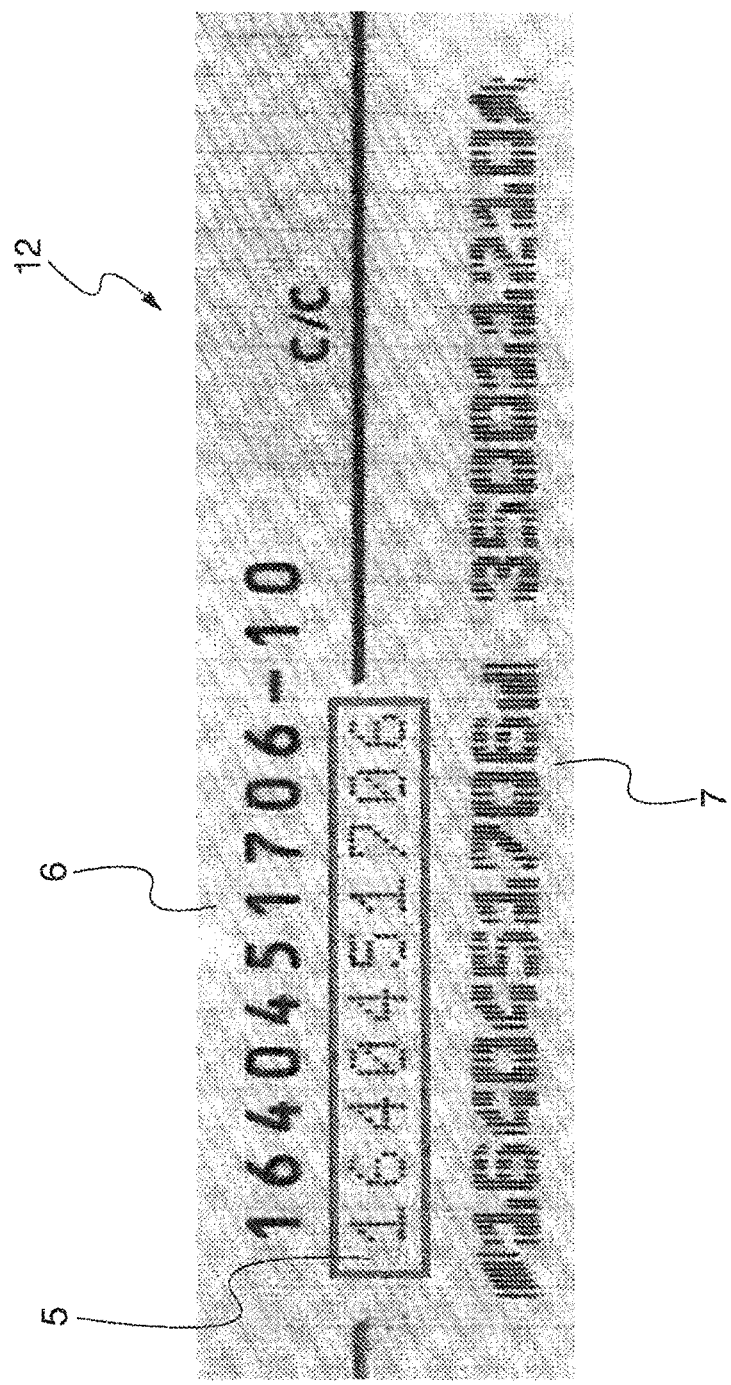
FIG. 1 schematically shows one side of a cheque having micro-perforated and imprinted characters.
Figure 2:
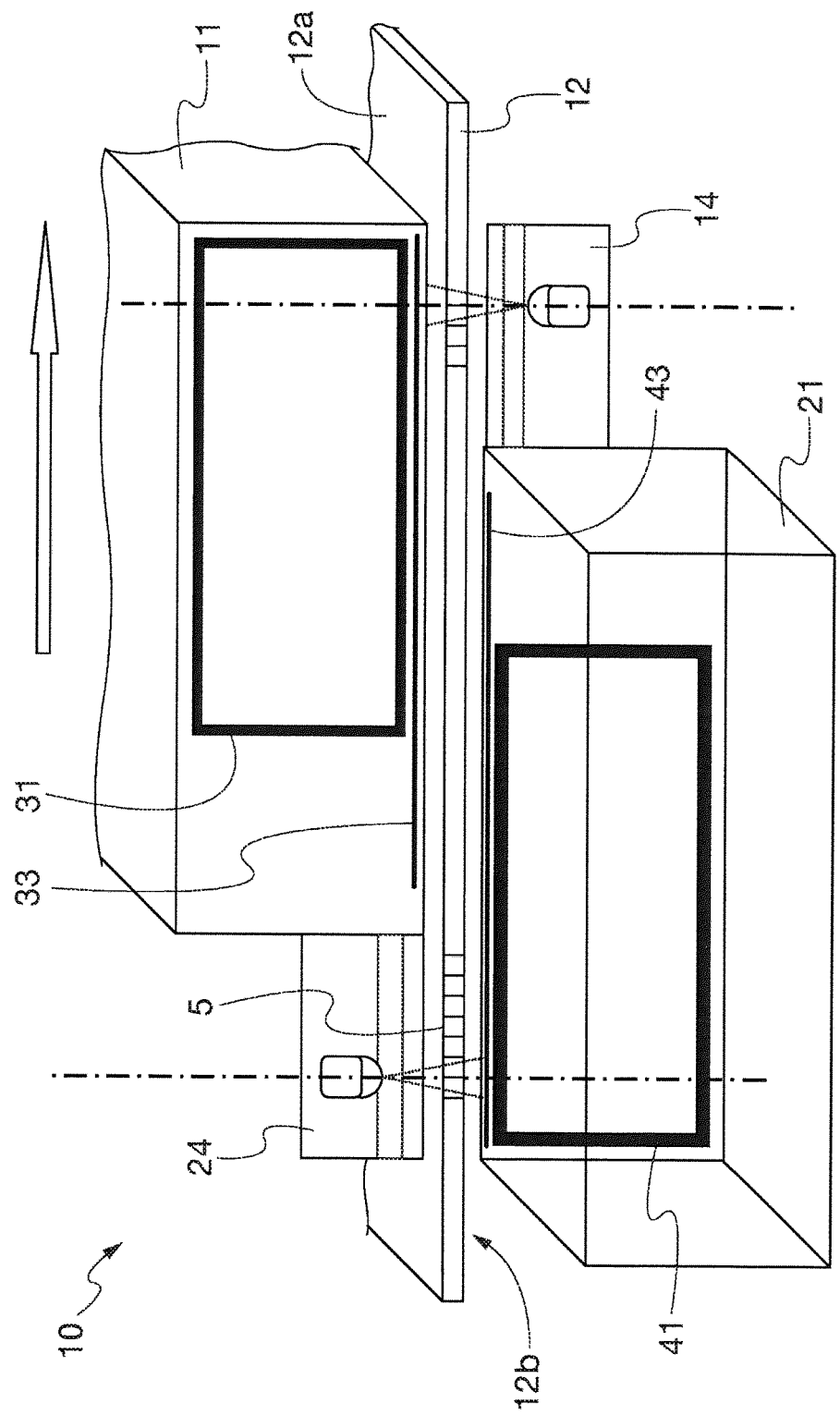
FIG. 2 schematically shows sensor devices provided in one embodiment of the device according to the invention.

With reference to FIG. 2 a device (10) for reading and decoding graphic patterns, for instance a cheque scanner arranged to read and decode paper or non-paper documents 12 including transmission patterns 5, for instance micro-perforated characters or symbols (micro-perforated patterns) (FIG. 1 and FIG. 2) and characters or symbols (graphic patterns) graphically 6 or magnetically 7 imprinted on one or both sides of the cheque, is disclosed.

The device 10, preferably, comprises at least a first image sensor 11, for instance a Contact Image Sensor (CIS) of known type, for instance of LC3R216 type, Made by SHEC Corporation.

Such type of component is arranged to read images in the visible light spectrum and comprises, for instance, a linear array of detectors (first image detectors) 31 and a corresponding linear array of LEDs (first image sensor LEDs) 33 flanked by the image detectors 31 and arranged to be activated for flashing light at certain time intervals on the document 12 moving, for instance, at a certain average speed.

The Applicant, however, has noted that available image sensors 11 can typically read images in the infrared (IR) spectrum. This is the case, e.g., for the above mentioned type of component.

More preferably, the image sensor LEDs 33 are red, green and blue LEDs and the image detectors 31 are arranged to detect at least red, green, blue and, as noted by the Applicant, infrared light.

The linear dimension of the image detectors 31 and of the image sensor LEDs 33 may range among A6, A4, A3, A2 etc. as a function of the type of documents to be managed by the device 10.

The image sensor LEDs 33 are arranged to flash light according to a certain timing on a first side 12a of the document 12 so that the image detectors 31 located on the same side may read the light reflected or scattered at least by graphic patterns, 6 and/or 7.
The reading may be in the range of grey scale values or in the range of colour scale values.

Preferably, the device 10 further comprises a second image sensor 21, for instance of the same type as the first one, positioned so as to read and decode a second side 12b of the document 12, and including a respective linear array of detectors (second image detectors or reading means) 41 flanked by a corresponding linear array of LEDs (second image sensor LEDs) 43 arranged to illuminate the second side 12b.

The second image sensor 21, if present, operates in a way substantially similar or identical to that disclosed with reference to the first image sensor 11.
However, as apparent to a person skilled in the art, the second image sensor 21 may be missing.

According to the preferred embodiment of the present invention, the device 10 further comprises at least a first light flashing component (IR flashing source) 14 or 24 located in front of either of the two image sensors, respectively 11 or 21. The first IR flashing source can comprise, for instance, located in front of either of the two image sensors, 11 or 21, a linear array of light emitters in the infrared spectrum, for instance a linear array of IREDs or an optical diffuser having an infrared light source, a light guide and a step mirror inside. According to such embodiment, the document 12 may move between the first IR flashing source 14 and the first image sensor detector 31 so that the light passing through the micro-perforated patterns 5, for instance the infrared light flashed by the first IR flashing source 14, may reach the first image sensor reading detector 31.
Thanks to this structure the micro-perforated patterns 5 may be read or acquired by the first image sensor 11.

According to a further embodiment of the present invention, a second flashing component 24 is provided located in front of the second image sensor 41, in a configuration substantially identical to that already disclosed for the first IR flashing source 14.
Such second flashing component (second emitters) 24 may be missing, but, if present, may be useful when documents to be read comprise, for instance, "watermark" patterns or when the micro-perforated patterns need to be read twice in order to better check the document validity.
As apparent to a person skilled in the art, the presence of two linear arrays of emitters or IR flashing source, 14 and 24, may also be useful in case of failure of one of the two linear array of emitters or IR flashing source.

Figure 3:
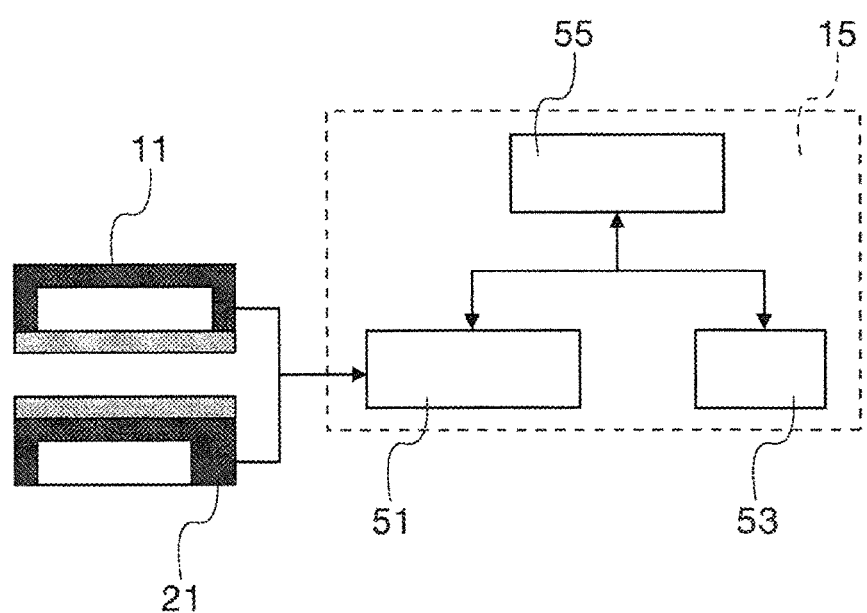
FIG. 3 schematically shows a block diagram of the device shown in FIG. 2.

The device 10 according to any one of the above embodiments further comprises, connected to the image sensors, 11 or/and 21, an electronic circuitry (control circuit) 15 (FIG. 3) arranged to manage the information read by the image sensors, 11 or/and 21, and to send the information, possibly processed by the control circuit 15, to one or more computers external to the device 10.

The control circuit 15 according to a preferred embodiment comprises a component 51 for converting analog signals coming from each image sensor, 11, 21, into digital signals, for instance an A/D converter made by WOLFSON MICROELECTRONICS TYPE WM8216, a programmable component 53, for instance a FPGA component made by XILINX TYPE XC6SLX9, arranged to implement the logic blocks to generate the timings for the A/D converter, the light sources and the sensors, to receive the data from the A/D converter and to send the processed information to an external computer, and a control unit (CPU) 55, for instance a microprocessor made by RENESAS TYPE H8SX1650, arranged to control operation of the A/D converter 51 and of the FPGA 53.

According to a first embodiment, the control circuit 15 is arranged to control reading of graphic patterns 6 and/or 7, illuminated and reflected or scattered, and of micro-perforated patterns 5, illuminated and crossed by the light of front-sided IR light source, by:
1—converting analog signals coming from the image sensor (11) into digital signals; and
2—obtaining bit-maps of all the patterns read, 5, 6 and/or 7.

According to a second embodiment, the control circuit 15 is arranged, in addition to the above steps 1 and 2, to:
3—compress the bit-maps; and
4—encrypt the compressed bit-maps, preferably by means of a hardware (HW) cryptography.

According to a third embodiment, the control circuit is arranged, after step 2 and, if required, before steps 3 and 4, to:
2.1—decode the bit-maps of the micro-perforated patterns into symbols/characters, e.g. ASCII characters.

According to all the above embodiments, the control circuit 15 is arranged to send the processed information to the external computer.
The third embodiment may be useful in order to send to the external computer only the decoded micro-perforated pattern 5, so as to avoid to send the bit-map of the micro-perforated pattern which may contain a heavy amount of information or data.

An example of the process for reading a document including both graphical patterns 6 and/or 7, and micro-perforated patterns 5 is provided hereinafter.

Assuming to have a device 10 including at least one image sensor 11 having, for instance, A4 dimensions and 300 dpi resolution along a first A4 dimension, the image sensor is arranged to read about 2480 pixels per line, i.e.

$$(210/25.4) \times 300$$

wherein 25.4 is a conversion factor from inches to mm.

Assuming that the image sensor 11 is arranged to read a set of 2480 pixels every 310 μsec, the corresponding speed of the document in front of the image sensor 11 while maintaining the same resolution of 300 dpi along a second A4 dimension, may be considered to be about 273 mm/sec, i.e.

$$(25.4/300)/(310 \times 10-6).$$

The exemplified speed is the average speed that may be used for moving the document step-by-step and the time interval of 310 μsec is the time interval for flashing light with the image sensor LEDs (light flashing means), 33 or 43, and with the IR flashing source, 14 or 24, in order to read 2480 pixels every 310 μsec.

In particular, according to the above example the image sensor, 11 or 21, is arranged to respectively acquire 2480 pixels alternately of the light reflected by the graphical patterns or of the light passing through the micro-perforated patterns or of the "watermark" patterns every 310 μsec.

The above exemplified reading steps are followed, in general, by corresponding steps wherein the A/D converter 51 is arranged to convert the analog signals generated by the image sensor, 11 or 21, into digital signals.

Control of flashing, reading and moving the document 12 is assigned to the control circuit 15 in step 1 already disclosed.

The operation of the device 10 as described above is the following, for instance according to the embodiment wherein only one image sensor 11 is provided.

As apparent to a person skilled in the art, this part of the operation does not change in the case of the other embodiments disclosed according to present invention.

In a first step the document 12 is moved at a certain speed, for instance at a constant speed so as to be positioned in front of the image sensor 11.

Figure 4:
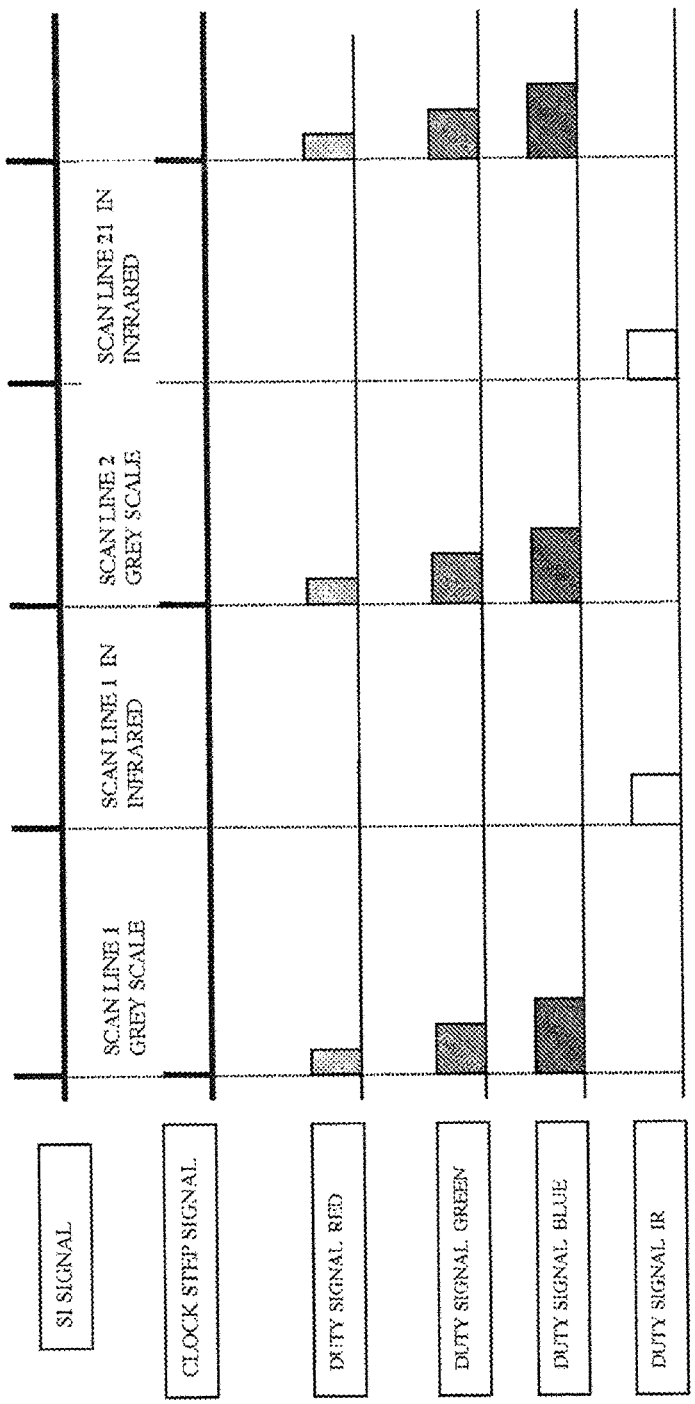
FIG. 4 schematically shows a first example of time intervals provided for reading patterns with a sensor device of the invention.
Figure 5:
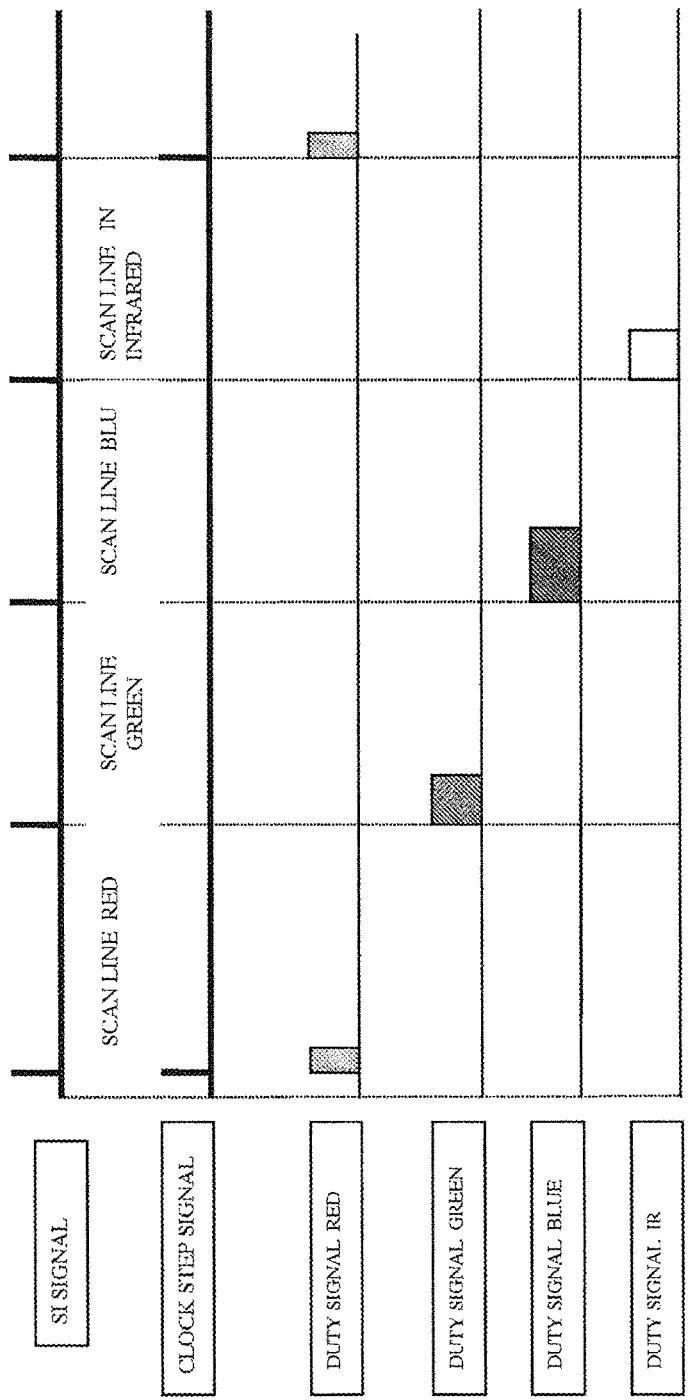
FIG. 5 schematically shows a second example of time intervals provided for reading patterns with a sensor device of the invention.

When, for instance, the document is recognized as having arrived in front of the image sensor 11, the image sensors LEDs 33 and the IR flashing source 14 are alternately activated according to a timing scheme as shown in FIG. 4 if a grey scale is used, and as shown in FIG. 5 if a colour scale is used.

In particular FIG. 4 and FIG. 5 show different examples of timing of a device according to the invention, keeping as a reference the following parameters wherein:

SI or Integration Time is representative of a unitary time required by the image sensor for reading the analog signals coming from the pixels of a line along a first dimension, for instance from 1280 pixels, corresponding to the unitary time of 310 μsec above exemplified;

CLOCK STEP SIGNAL is representative of the step timing for moving the document step-by-step along the second dimension of the document, such second dimension being orthogonal to the first one;

DUTY SIGNAL is representative of the timing for activating flashing of the image sensor LEDs 33 and of the IR flashing source (emitters) 14.

According to the example shown in FIG. 4, grey scale use, the image sensor LEDs 33 and the emitters 14 are arranged to alternately emit light so as to allow the image detectors 31 to read analog signals every SI unitary time. As known to a technician in the field the duty signal of each light source, red, green, blue is different in order to compensate the different efficiency of the different light sources. Accordingly the CLOCK STEP SIGNAL unitary time is twice as long as the SI unitary time.

According to the example shown in FIG. 5, colour scale use, the image sensor LEDs 33 and the emitters 14 are arranged to emit colour light and infrared light according to a respective DUTY SIGNAL so as to allow the image detectors 31 to read analog signals every SI unitary time. Accordingly the CLOCK STEP SIGNAL unitary time is four times the SI time.

In summary, as apparent from the examples shown in FIG. 4 and FIG. 5, the average speed for reading the document step-by-step is faster in case of grey scale use than in case of colour scale use.

Advantageously, the device according to the invention is structurally very simple.

As a matter of fact, the device comprises, in addition to other components, one or two arrays of emitters, or elongated emitters, located in front of the image sensors so as to enable reading of micro-perforated patterns.

The use of arrays of emitters grants the possibility that the device be comprised, for instance, of CIS (Contact Image Sensors) of common use.

According to the invention, the emitters can operate with any type of light thanks to the fact that the emitters are flashing at different times as regards the image sensor LEDs.

Advantageously, the arrays of emitters operate with IR light, thanks to the fact that the known Image Sensors (CIS) are able to read not only color light but also IR light.

Such a feature is very important because it is apparent that the invention can be implemented by conveniently adding an IR flashing source to a device that includes common CIS, i.e. in a very simple and cheap way.

More advantageously, the IR flashing source may be used in connection with the image detectors also for reading "watermark" patterns so as to add a further level of security to the reading and checking of documents.

Of course, without prejudice to the basic principles of the invention, the details and embodiments may vary, also significantly, with respect to what has been described herein by way of examples only, without departing from the scope of the invention as defined by the claims that follow.

The invention claimed is:

1. A device for reading and decoding paper or non-paper documents (12) including transmission patterns (5) consisting of micro-perforated or watermark patterns and graphic patterns (6, 7), said device comprising: at least one image sensor (11) having a light flashing component (33) that flashes a visible light on a first side (12*a*) of a document (12), and image detectors (31) that read said visible light reflected or scattered by said graphic patterns (6, 7); at least one further light flashing component (14) located in front of said image sensor (11) that flashes an infrared light on a second side (12*b*) of the document (12); said image detectors (31) reading the infrared light passing through the transmission patterns (5); a control circuit (15) that manages said image detectors (31) to read said visible light reflected by said graphic patterns (6, 7) and said infrared light passing through the transmission patterns (5), and to obtain bit-maps of the patterns read (5, 6, 7), wherein said control circuit decodes the bit-maps of the transmissions patterns (5) into symbols or characters, compresses the bit-maps and encrypts the compressed bit-maps and sends to an external computer only said decoded transmission patterns; wherein said control circuit comprises at least one FPGA component (53) and at least one CPU (55) that controls operation of an A/D converter to convert analog signals coming from said at least one image sensor (11) into digital signals and that controls operation of the FPGA component (53) to at least construct bit-maps of the transmission patterns (5) and of the graphic patterns (6, 7).

2. The device according to claim 1 wherein said further light flashing component (14) comprises a linear array of light emitters.

3. The device according to claim 1 wherein said further light flashing component (14) comprises an optical diffuser having an infrared light source and a light guide.

4. The device according to claim 1, further comprising:
a second image sensor (21) that flashes a visible light on a second side (12*b*) of a document (12), and second image detectors (41) that read said visible light reflected or scattered by said graphic patterns (6, 7); and a corresponding light flashing component (24) located in front of said second image sensor (21) that flashes an infrared light on said first side (12*a*) of the document (12);

said second image detectors (41) reading the infrared light passing through the transmission patterns (5).

5. The device according to claim 1, wherein said control circuit comprises at least one A/D converter (51).

6. A method for reading and decoding paper or non-paper documents (12) including transmission patterns (5) consisting of micro-perforated or watermark patterns and graphic patterns (6, 7), said method comprising the steps of; positioning the document (12) in front of an image sensor (11) that reads light signals; flashing a visible light on a first side (12*a*) of a document (12); flashing an infrared light on a second side (12*b*) of the document (12); reading the light signals reflected or scattered by said graphic patterns and the light signals passing through the transmission patterns (5) with said image sensor (11); converting analog signals coming from said at least one image sensor (11) into digital signals; and obtaining bit maps of the transmission patterns (5) and of the graphic patterns (6, 7), wherein the step of obtaining bitmaps of the transmission patterns (5) and of the graphic patterns (6, 7) comprises the step of decoding the bit-maps of the transmissions patterns (5) into symbols or characters; compressing the bit-maps of the transmission patterns (5) and of the graphic patterns (6, 7); and encrypting the compressed bit-maps, and sending only said decoded transmission patterns to an external computer for certifying authenticity of the document (12) using the decoded transmission patterns.

7. The method according to claim 6, wherein said step of flashing an infrared light on a second side (12*b*) of the document (12) comprises the step of flashing an infrared light by means of at least one array of light emitting means (14, 24) located in front of said document and of said image sensor (11).

8. The method according to claim 6, wherein said step of flashing an infrared light on a second side (12*b*) of the document (12) comprises the step of flashing an infrared light by means of an optical diffuser having a light guide.

9. The method according to claim 6, wherein said step of flashing a visible light on a first side (12*a*) of a document (12) and said step of flashing an infrared light on a second side (12*b*) of the document are made according to a different timing so that the image sensor is able to read the visible light and the IR light with a respective different timing.

* * * * *